US011641651B2

(12) United States Patent
McCoy et al.

(10) Patent No.: US 11,641,651 B2
(45) Date of Patent: *May 2, 2023

(54) UPLINK CONTROL CHANNEL ALLOCATION IN A COMMUNICATION SYSTEM AND COMMUNICATING THE ALLOCATION

(71) Applicant: Apple Inc., Cupertino, CA (US)

(72) Inventors: James McCoy, Austin, TX (US); Leo Dehner, Austin, TX (US); Jayesh Kotecha, Austin, TX (US); Jayakrishnan Mundarath, Austin, TX (US)

(73) Assignee: Apple Inc., Cupertino, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/188,558

(22) Filed: Mar. 1, 2021

(65) Prior Publication Data

US 2021/0185668 A1  Jun. 17, 2021

Related U.S. Application Data

(63) Continuation of application No. 16/677,872, filed on Nov. 8, 2019, now Pat. No. 10,939,421, which is a
(Continued)

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/0003* (2013.01); *H04L 5/0055* (2013.01);
(Continued)

(58) Field of Classification Search
None
See application file for complete search history.

(56) References Cited

U.S. PATENT DOCUMENTS

| 6,370,153 B1 | 4/2002 | Eng | |
|---|---|---|---|
| 6,522,670 B1 * | 2/2003 | Jokinen | H04W 48/12 370/503 |

(Continued)

FOREIGN PATENT DOCUMENTS

| EP | 0942579 | 9/1999 |
|---|---|---|
| EP | 0946072 A1 | 9/1999 |

(Continued)

OTHER PUBLICATIONS

European Office Action; Application No. 19191007.4; dated Jan. 28, 2022; 9 pgs.

(Continued)

*Primary Examiner* — Hong S Cho
(74) *Attorney, Agent, or Firm* — Kowert, Hood, Munyon, Rankin & Goetzel, P.C.

(57) ABSTRACT

Various methods of allocating uplink control channels in a communication system are implemented at a resource scheduler or a user equipment (UE). In one method the scheduler reserves resources for a downlink data channel and signals a corresponding downlink data channel grant and also reserves resources for a persistent uplink control channel for a longer duration than the data channel grant. Signaling overhead associated with a grant for this persistent uplink control channel is reduced over a full dynamic grant. A predetermined rule can be used at the scheduler and at the UE to avoid overhead signaling associated with a grant for this persistent control channel. Predetermined rules at the UE and scheduler can also be used to reserve appropriate resources and select appropriate MCS levels for control information and the control information and uplink data can (Continued)

be transported over a common uplink channel when a time overlap occurs between an uplink data channel and the persistent control channel.

20 Claims, 5 Drawing Sheets

Related U.S. Application Data continuation of application No. 15/894,044, filed on Feb. 12, 2018, now Pat. No. 10,506,568, which is a continuation of application No. 15/480,695, filed on Apr. 6, 2017, now Pat. No. 9,918,304, which is a continuation of application No. 14/960,516, filed on Dec. 7, 2015, now Pat. No. 9,648,639, which is a continuation of application No. 14/090,917, filed on Nov. 26, 2013, now Pat. No. 9,210,699, which is a continuation of application No. 11/725,422, filed on Mar. 19, 2007, now Pat. No. 8,724,556.

(51) Int. Cl.
*H04W 72/12* (2009.01)
*H04W 28/26* (2009.01)
*H04L 1/00* (2006.01)
*H04W 72/14* (2009.01)
*H04W 72/1263* (2023.01)

(52) U.S. Cl.
CPC ....... *H04W 72/1284* (2013.01); *H04W 72/14* (2013.01); *H04W 28/26* (2013.01); *H04W 72/04* (2013.01); *H04W 72/1263* (2013.01)

(56) References Cited

U.S. PATENT DOCUMENTS

| | | | |
|---|---|---|---|
| 7,006,469 B1 | 2/2006 | Roark et al. | |
| 7,447,504 B2 | 11/2008 | Lohr et al. | |
| 2001/0030956 A1* | 10/2001 | Chillariga | H04W 28/26 455/452.2 |
| 2002/0197959 A1 | 12/2002 | Attar et al. | |
| 2003/0013451 A1 | 1/2003 | Walton | |
| 2004/0131106 A1 | 7/2004 | Kanterakis | |
| 2005/0068884 A1 | 3/2005 | Yoon et al. | |
| 2005/0176435 A1 | 8/2005 | Fauconnier et al. | |
| 2005/0181797 A1 | 8/2005 | Piirainen | |
| 2005/0281219 A1 | 12/2005 | Kim et al. | |
| 2006/0003787 A1 | 1/2006 | Heo et al. | |
| 2006/0056350 A1 | 3/2006 | Love et al. | |
| 2006/0171295 A1 | 8/2006 | Ihm et al. | |
| 2006/0205414 A1 | 9/2006 | Teague | |
| 2006/0274690 A1* | 12/2006 | Chun | H04L 47/245 370/329 |
| 2007/0047474 A1 | 3/2007 | Anderson | |
| 2007/0097981 A1 | 5/2007 | Papasakellariou | |
| 2007/0109964 A1 | 5/2007 | Kwak et al. | |
| 2007/0171849 A1 | 7/2007 | Zhang et al. | |
| 2008/0080423 A1 | 4/2008 | Kolding et al. | |
| 2009/0116434 A1 | 5/2009 | Lohr et al. | |

FOREIGN PATENT DOCUMENTS

| | | |
|---|---|---|
| EP | 1046315 | 10/2003 |
| EP | 1351437 A1 | 10/2003 |
| EP | 1517456 | 3/2005 |
| EP | 1681790 | 7/2006 |
| EP | 1727296 | 11/2006 |
| EP | 1758277 A2 | 2/2007 |
| GB | 2423893 A | 9/2006 |
| WO | 9848586 | 10/1998 |
| WO | 2004/006603 A2 | 1/2004 |
| WO | 2004114549 | 12/2004 |

OTHER PUBLICATIONS

3GPP TSG RAN WG1 Meeting #48, Nokia, Data-non-associated control signal transmission with UL data, Feb. 12-16, 2007, R1-071000.
3GPP TSG RAN1 #48 Motorola, Multiplexing of Uplink Control signaling with Data, Feb. 12-15, 2007, R1-070777.
PCT/US2008/054352, International Search Report and Written Opinion, dated Jun. 27, 2008.
EP Application 08743498.1, Extended European Search Report, dated Jul. 12, 2013.
Extended European Search Report for European Patent Application No. 16166929.6, dated Jul. 14, 2016, pp. 1-4.
Sony Corporation: "UL Signaling for MCS selection and Scheduler," TSG-RAN Working Group 1 #21, TSGR1 #21 (01) 0858, Turin, Italy, Aug. 27-31, 2001, pp. 1-6.
Extended European Search Report for European Patent Application No. 17203922.4, dated Mar. 16, 2018, pp. 1-9.
Huawei Technologies, Co. LTD/CWTS, "Timing Relationship in HSDPA for 1.28Mcps TDD", TSG-RAN WG1 meeting #24, Tdoc R1-02-0203, Orlando, FL, USA, Feb. 18-22, 2002, pp. 1-5.
Siemens AG, "HSDPA open issues in RAN4", TSG-RAN Working Group 4 (Radio) meeting #22, R4-02603, Sophia Antipolis, France, Apr. 3-5, 2002, pp. 1-4.
European Application No. 19191007.4, Office Action, dated Dec. 23, 2020, 10 pgs.

* cited by examiner

UPLINK CONTROL CHANNEL ALLOCATION IN A COMMUNICATION SYSTEM AND COMMUNICATING THE ALLOCATION

PRIORITY CLAIM

This application is a continuation of U.S. patent application Ser. No. 16/677,872, entitled "Uplink Control Channel Allocation in a Communication System and Communicating the Allocation", filed on Nov. 8, 2019, which is a continuation of U.S. patent application Ser. No. 15/894,044, entitled "Uplink Control Channel Allocation in a Communication System and Communicating the Allocation", filed on Feb. 12, 2018, now U.S. Pat. No. 10,506,568, which is a continuation of U.S. patent application Ser. No. 15/480,695, entitled "Uplink Control Channel Allocation in a Communication System and Communicating the Allocation", filed on Apr. 6, 2017, now U.S. Pat. No. 9,918,304, which is a continuation of U.S. patent application Ser. No. 14/960,516, entitled "Uplink Control Channel Allocation in a Communication System and Communicating the Allocation", filed on Dec. 7, 2015, now U.S. Pat. No. 9,648,639, which is a continuation of U.S. patent application Ser. No. 14/090,917, entitled "Uplink Control Channel Allocation in a Communication System and Communicating the Allocation", filed on Nov. 26, 2013, now U.S. Pat. No. 9,210,699, which is a continuation of U.S. patent application Ser. No. 11/725,422, of the same title, filed on Mar. 19, 2007, now U.S. Pat. No. 8,724,556, which are fully incorporated herein by reference for all purposes and to the extent not inconsistent with this application.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD OF THE INVENTION

This invention relates in general to communication systems and equipment and more specifically to techniques and apparatus for allocating resources for communication channels.

BACKGROUND OF THE INVENTION

Communications systems and equipment are known and continue to evolve. Many of these systems now have uplink data channels and downlink data channels as well as uplink and downlink control channels. Many of these channels are further distinguished in varying manners. Generally the control channels are used to establish control parameters for the systems and equipment and in the allocation of communication resources among user equipment (UE). The control schemes also consider battery life for UEs and thus are designed to limit the time and extent that each UE is operational.

In an effort to provide as many services to as many users on an as needed basis as possible given a finite resource (spectrum allocation), proposed systems carefully control UE access to almost all of the spectral resources. This approach helps insure that resources are only allocated when a need exists and when such resources serve the intended purpose. For instance in a proposed Long Term Evolution (LTE) system now being developed, a UE only has access to limited channels, e.g., synchronization channel (SCH), broadcast channel(s) (BCH), reference signal (RS), a Random Access Channel (ASYNCH RACH, SYNCH RACH) and a paging channel (PCH) until some form of allocation or grant is provided to the UE by the system infrastructure (ENodeB or scheduler). This generally includes grants or allocations for each use of an uplink control channel or uplink and downlink data channel.

One of the concerns with this allocation approach, is the notion that each allocation requires some system overhead (messages between the UE and scheduler, ACK/NACKSs, etc). System overhead as it grows chips away at system capacity and thus is at odds with the objective of maximizing service availability.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
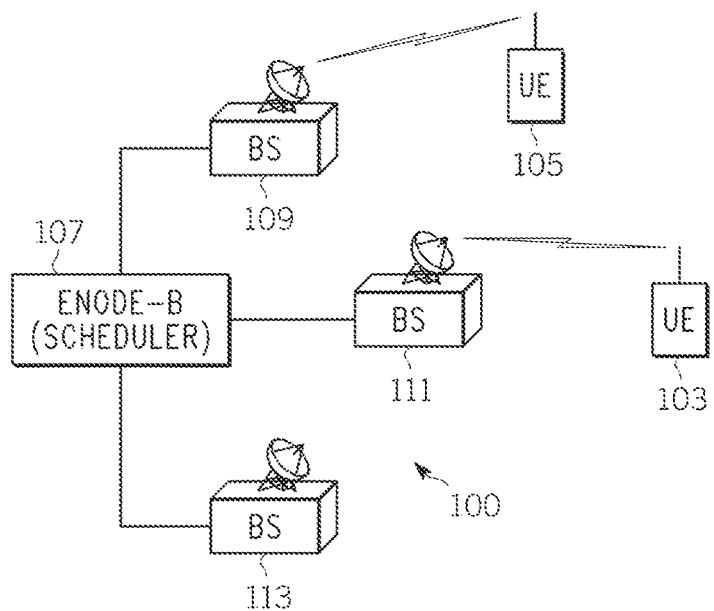
FIG. 1 depicts in a simplified and representative form, a high level diagram of a communications system and a plurality of user equipment (UE) in accordance with one or more embodiments.

In overview, the present disclosure concerns communication systems and equipment, e.g., resource schedulers and user equipment (UE), and more specifically techniques and approaches for allocation or configuration of uplink control channels. More particularly various inventive concepts and principles embodied in methods and apparatus, which are arranged to reduce or eliminate overhead associated with setting up or providing a grant for such control channels will be discussed and disclosed.

The communication systems, resource schedulers, UEs and methods therein of particular interest may vary widely but include such apparatus and methods suitable for utilization in systems using air interfaces being proposed and developed, such as the Evolved-Universal Terrestrial Radio Access (E-UTRA) standards within the long term evolution (LTE) system work under the auspices of the third generation partnership project (3GPP). These air interface standards are defined or organized such that access by a UE to most resources (frequency allocations over time) are allowed only based on UE requests and grants. Control channels and associated requests and grants as well as other overhead can use a significant amount of total system capacity. This overhead can be reduced using one or more embodiments of the methods and techniques of allocating uplink control channels, provided they are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative form, a high level diagram of a communications system and a plurality of user equipment (UE) in accordance with one or more embodiment will be briefly discussed and described. FIG. 1 will help establish some context for following discussions and serve to familiarize the reader with some vocabulary and the like. FIG. 1 shows a communication system or infrastructure 100 that is arranged and configured to provide services via wireless links to a plurality of UEs (two shown) 103, 105. The infrastructure includes an evolved Node-B (Enode-B) 107 which includes a scheduler or resource scheduler. The Enode-B is normally coupled to a switching center of some form and from there to other public switched networks, e.g., public switched telephone network, Internet, or other packet and possibly circuit switched networks.

Enode-B 107 is also, as shown, coupled to and responsible for controlling one or more base stations 109, 111, 113. Base station or Base Site (BS) 111 is coupled, via a wireless channel, to UE 103 and thus is referred to as the serving BS for UE 103, while BS 109 is the serving BS for UE 105. Each BS is normally the serving BS for a multiplicity of UEs. In many systems the serving BS is responsible for or provides appropriate instructions to the served UEs to establish desired transmitter power levels and insure synchronization (proper timing) between the BS and UE. The ENode-B, specifically resource scheduler and corresponding functions is arranged and configured to or for allocating resources among control and data channels for both downlink and uplink transmissions to or from UEs (downlink is from the base station to the UE and uplink is from the UE to the base station). Pursuant to scheduling, the scheduler attempts to provide reasonably fair access to desired resources for all UEs on as needed and available basis. The scheduler must consider available resources (subcarriers and time slots), channel quality, UE capabilities and limitations, anticipated type of data transfer, QoS expectations or requirements, system constraints, and various other factors. Generally the scheduler operates or manages resources by issuing or signaling channel grants to specific UEs, where these grants may be driven or initiated by data download requirements or responsive to a call request from a UE.

The E-UTRA system operates with a scalable bandwidth from 1.25-20 MHz, uplink channel is SC-FDMA with up to 1201 subcarriers at a 15 KHz spacing and 1.0 mille seconds (ms) subframes on consecutive 0.5 ms time slots. One constraint that is placed on the E-UTRA system is the result of using the SC-FDMA uplink physical channel and a desire for simple cost effective UE. The resultant air interface standards mandate that all uplink transmissions from a given UE during a given time slot will be on contiguous or adjacent subcarriers or equally spaced subcarriers. With this constraint, UE can transmit signals with overall smaller peak to average levels, which allows for less expensive transmitters and longer battery life.

Figure 2:
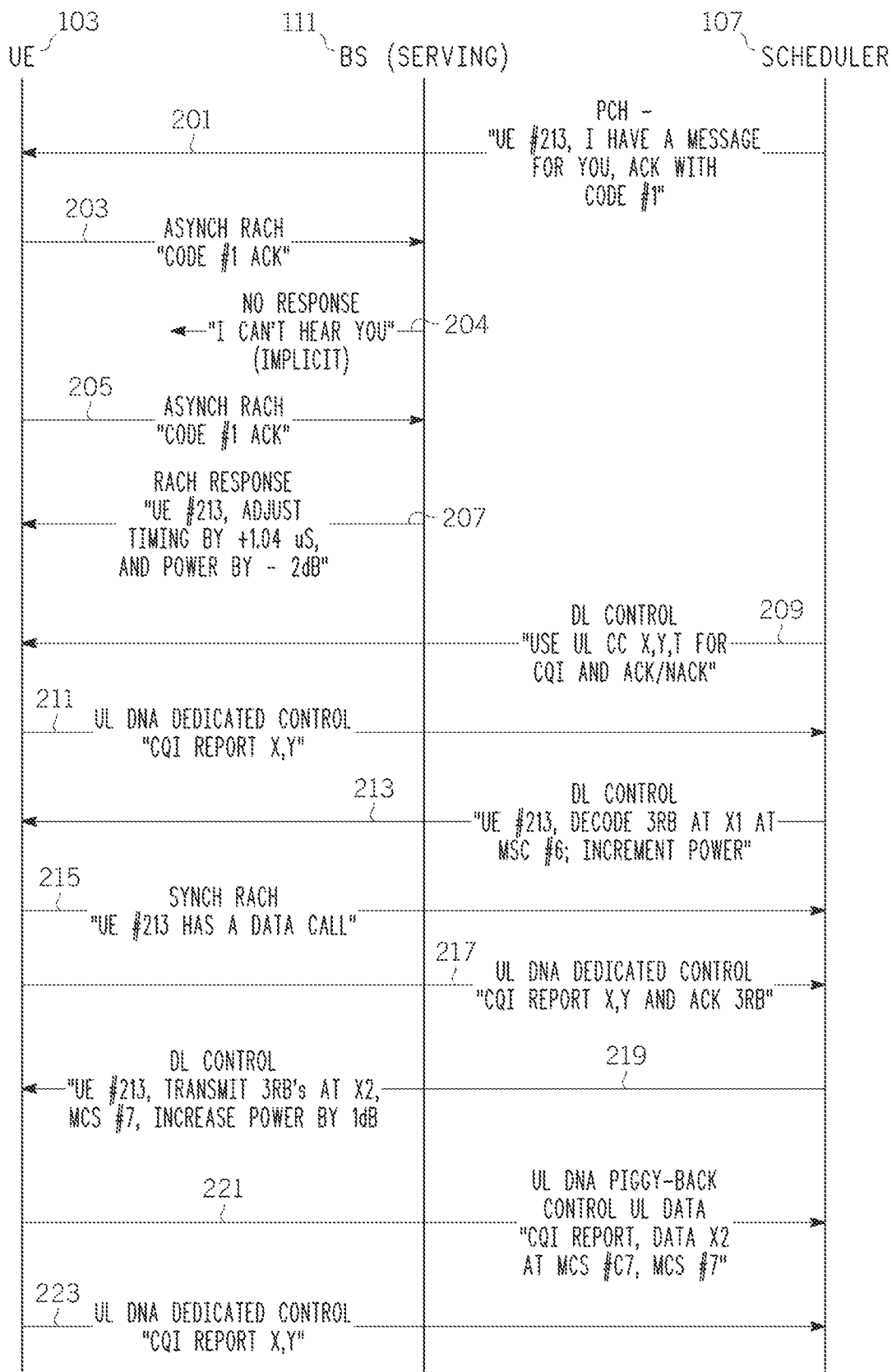
FIG. 2 in a simplified form, shows a diagram of representative messages that can be exchanged in the system of FIG. 1 which serve to illustrate either by inclusion or exclusion messages or interaction between various FIG. 1 entities in accordance with one or more embodiments.

Referring to FIG. 2, a simplified diagram of representative and exemplary messages that can be exchanged in the system of FIG. 1 and which serve to illustrate either by inclusion or exclusion messages or interaction between FIG. 1 entities in accordance with one or more embodiments will be briefly discussed and described. It will be appreciated that the exact messages and forms thereof as exemplified by FIG. 2 may be changed in practice or as standards are developed so long as similar or functionally equivalent interactions are supported. FIG. 2 is often referred to as a bounce or ladder diagram with time increasing from top to bottom and shows the origin and destination entities for various messages and in some instances the causal relationship between those interactions. The relevant entities, shown across the top portion of FIG. 2, include a UE, e.g., UE 103, a serving BS, e.g., serving BS 111, and a scheduler or resource scheduler, e.g., ENode-B scheduler 107.

At the top of FIG. 2, the infrastructure or scheduler 107 has a message to be delivered or downloaded via a downlink through serving BS 111 to UE 103. A downlink message is transmitted over a paging channel 201, where this message identifies the specific UE (here UE #213) as well as an acknowledgment code (ACK code #1) to be used by the UE. In this instance the UE was in an idle mode (low battery consumption mode) and merely waking up on a schedule, known to the scheduler, essentially to see whether any messages are available for the UE. Upon receipt of the page, UE 103 (identified as UE #213) responds on an asynchronous random access channel (ASYNCH RACH) 203 with the designated ACK code #1 203. By specifying an ACK code, responses (ACKs) from multiple UEs can be distinguished at the serving BS. UEs when responding from an idle state do so at a relatively low power level and thus sometimes as here the serving BS 111 does not receive the ACK and thus does not respond to the UE 204. The UE after a wait period of time and at a higher power level again responds 205 with ACK code #1.

In this instance, the serving BS 111 receives the ACK and responds on a random access channel (RACH) 207 with a timing adjustment and power adjustment instruction to the specific UE, i.e., UE #213. At this point the UE is synchronized to the serving BS and its transmit power level is appropriately adjusted. The ASYNCH RACH and RACH are channels that are shared by all UEs within the area or cell being served by a given serving BS. Note that if an idle UE had a message or data to send, the message exchange would be initiated by the UE on the ASYNCH RACH with a short message (RACH request) indicating that UE code #1 has a message to send and after essentially the exchange above the UE would be synchronized and know the proper power level.

In FIG. 2 after synchronization message 207, the UE receives an uplink channel grant from the scheduler through the BS via a message over a downlink (DL) control channel 209. This downlink control message at 209 includes an uplink data non-associated (DNA) control channel grant, specifically indicating that the UE should use uplink (UL) control channel (CC) X, Y, T, for CQI and ACK/NACK messages, where X, Y denotes the control channel (e.g., partitioning of the uplink dedicated control channel, which is a group of subcarriers and spreading codes), T denotes timing information associated with the grant, CQI denotes channel quality indications, and ACK/NACK denotes acknowledgment/non-acknowledgement.

In most systems and as presently proposed for E-UTRA where resources are carefully and closely scheduled, the UL CC grant is a one time or dynamic grant which is sent to the UE each time a DNA message is desired or expected by the scheduler. In contrast in one or more instant embodiments, the inventors have proposed a persistent UL DNA control channel grant, where the grant has a duration that can last for a plurality of CQI reports or ACK/NACKs. Thus in various embodiments, T as used here denotes a duration (seconds or less and may be a function of, e.g., context or type of call (longer for voice than small data file) or configurable by Network or serving BS) and in some instances a periodicity parameter (e.g., several times per second, dependent on context, mobility parameters, UE state). CQI reports or messages are the results of the UE scanning a multiplicity of reference signals on downlink channels and assessing a channel quality at the UE for these various reference signals. The reference signals and reference channels are known to the UE and are used by the UE for channel estimation, etc. The CQI information is used by the scheduler for grants to the UE in order to insure appropriate quality of service (QoS) or reliability objectives are maintained in message delivery.

Given the UL CC grant at 209, the UE responds on the UL DNA control channel 211 with a CQI report, i.e., transmits CQI report at X, Y which is delivered by the BS to the scheduler as illustrated. The scheduler, given the CQI and any other relevant factors, then issues or signals on a DL control channel a down link (DL) data channel grant 213. In this instance the DL data channel grant is directed to the UE and indicates in an exemplary manner that "UE #213 should decode 3 RBs at X1, MCS #6 and increment power." RB denotes resource blocks where a resource block is a 1 milli second (ms) subframe on each of 12 contiguous (or evenly spaced) subcarriers. In E-UTRA each 1 ms represent 14 symbols, where the number of bits per symbol depends on the modulation and channel coding rates. X1 denotes resource block start point. MCS denotes modulation and coding scheme, where E-UTRA is presently considering a multiplicity (tens) of different MCS levels. An MCS level normally includes or defines coding rate (information bits per coded bits) and a modulation type or symbol alphabet, e.g., 16 QAM (quadrature amplitude modulation)—where each symbol is 4 bits, and may include packet sizes and other attributes. Although not specifically shown, the actual down link data will be sent to UE and presumably decoded.

FIG. 2 next shows a data call request being generated by the UE and transmitted on the RACH channel 215 which is a SYNCH RACH since the UE has already been synchronized (205, 207). Typically the call request will include some information that allows the scheduler to ascertain bandwidth and QoS levels needed (e.g., a voice call, data call, streaming video are dramatically different call requests). Note that the call request may be responsive to the decoded RBs. The call request is forwarded to the BS 111 and the scheduler 107. Also as shown at 217, the UE transmits on the UL DNA control channel X, Y, a new CQI report and ACKs the 3RB (referred to at 213). As will be further discussed and described below the UL DNA control message at 217 is over the persistent UL DNA control channel which was granted at 209 and thus avoids signaling overhead for a new UL DNA control channel.

The scheduler responsive to the call request and other factors (CQI report, etc) signals the UE an uplink data channel grant on a DL control channel 219. The uplink channel grant as illustrated directs UE #213 to transmit 3RBs at X2 (resource block starting point) and MCS #7 and to increase power by 1 dB. Responsive to the uplink data channel grant and in recognition that another CQI report is due and will overlap in time at least in part with the data transmission, the UE transmits both the CQI report and Data on X2 at MCS #C7 and MCS #7, respectively, where MCS #C7 represent a control MCS for DNA control information. In essence the UE has selected a control MCS based on a predetermined rule that the UE and the scheduler know and has "piggy backed" both the DNA control information and the uplink data in one message on the uplink channel or uplink data channel. This allows the UE to maintain the periodicity of the CQI information and use contiguous subcarriers, all without incurring any additional control or signaling overhead. It will be appreciated that the scheduler is free to use the resources that would have been used for the persistent control channel for other purpose (dynamic grants to other UEs), during the uplink data channel time slot(s). This and other embodiments will be further described and discussed below. Furthermore, after transmission of the DNA information and data at 221, the UE sends in the next CQI report on the persistent UL DNA control channel, i.e. CQI reports is forwarded at X, Y as originally granted at 209. It will be appreciated that the link between the scheduler 107 and the serving BS 111, although not explicitly shown, is typically a link that utilizes Internet Protocol or other protocol that may be found in terrestrial applications, where as the link between the serving BS and the UE is a wireless link utilizing an air interface such as the E-UTRA interface and that the BS is all instances must make this translation including appropriate encoding/decoding and modulation/demodulation.

Figure 3:
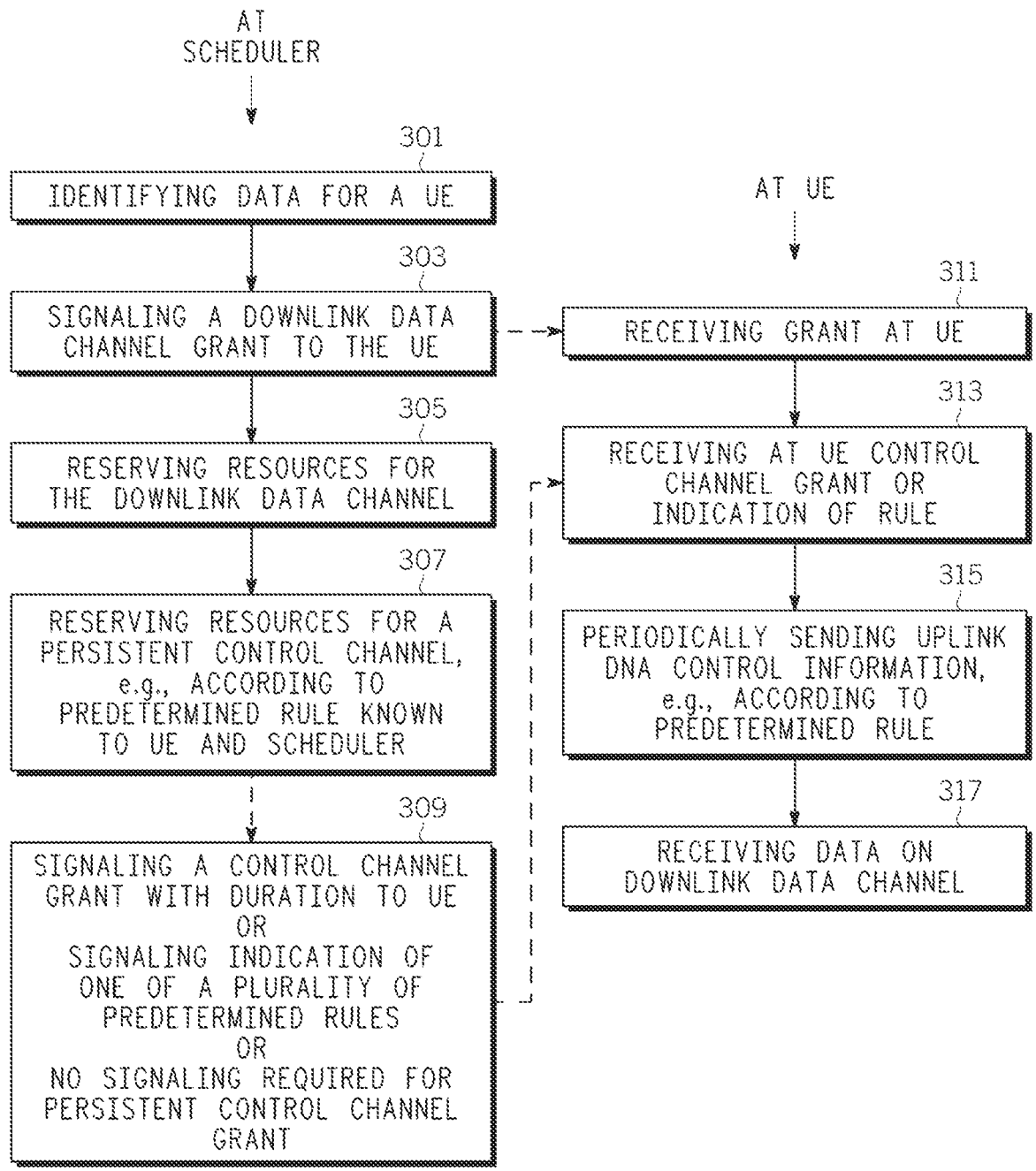
FIG. 3 shows a flow chart of processes for allocating control channels executed at a scheduler or UE in accordance with one or more embodiments.

Referring to FIG. 3, a flow chart of processes for allocating control channels, where the processes can be executed at a scheduler or UE in accordance with one or more embodiments will be discussed and described. FIG. 3 shows a method of allocating uplink control channels in a communication system where a scheduler or a UE is able to forego all or a portion of the signaling that would normally be required or present for an uplink control channel grant. In the method of FIG. 3, the scheduler has been provided or been made aware of data (packets, files, etc.) that needs to be delivered or transported to the UE. Ordinarily in evolved systems, e.g., LTE systems, this requires the scheduler to issues one or more downlink data channel grants as well as corresponding uplink control channel grants.

In FIG. 3, the method comprises, at a resource scheduler, identifying data to be scheduled for transport to a user equipment (UE) 301. The scheduler identifies resources for a downlink data channel (not specifically shown) and initiates signaling 303 a downlink data channel grant identifying a downlink data channel to be used by the UE for the reception of the block of data. These functions or the associated signaling are illustrated in FIG. 2 for a UE that starts in an idle state by 201-207. The scheduler also undertakes reserving resources for the downlink data channel 305 as well as, essentially concurrently, reserving resources for an uplink control channel that is dedicated for use by the UE, where the resources for the uplink control channel are reserved for a longer time duration than the resources for the downlink data channel, i.e., resources are reserved for a persistent uplink control channel.

Various embodiments also include signaling 309 an uplink control channel grant for the UE, with the uplink control channel grant including an indication of the longer time duration, thereby avoiding repetitive signaling associated with a dynamic uplink control channel grant. In FIG. 2, this corresponds to 209 and the "T" parameter, which as discussed above represented a persistent uplink control channel grant. Note that additional grants were not required for the uplink control information sent at 217, 223.

In some embodiments, the identifying and reserving resources for the uplink control channel is done in accordance with a predetermined rule known by the scheduler and the UE 307, thereby avoiding signaling to the UE that is associated with an uplink control channel grant 309 (NO SIGNALING). In these instances the scheduler can reserve resources and the UE can utilize those same resources without an explicit indication of or message specifying the same being sent from the scheduler to the UE. The predetermined rule can depend on or specify control channel characteristics including one or more of channel frequency, transmission start time, spreading codes, MCS levels, periodicity, the longer time duration, etc. with any or all of these being context sensitive (dependent on type of data to be transferred to the UE or to the scheduler) or configurable by the network (via BCH) or by the serving BS. For example, the duration is likely longer for a voice type call than for a short message delivery. Other examples will be evident to those of ordinary skill. Furthermore, the configuration by the network or the serving BS will allow this essentially implicit grant process to be discontinued or otherwise limited or expanded as desired or appropriate.

In yet other embodiments, the identifying and reserving resources for the uplink control channel can be done in accordance with a predetermined rule that is selected from a plurality of rules that are known to the scheduler and the UE. In this instance the scheduler or BS may need to initiate signaling an indication of the predetermined rule or rule set to the UE 309 (SIGNALING INDICATION . . . ), however even here there would be limited signaling to the UE when compared to that associated with a full dynamic uplink control channel grant. The rule can depend on the semi-static dimensions or physical partitioning of the dedicated control channel (group of subcarriers devoted to control channel signaling). The rule can be dependent on the channel quality of the UE or the UE transmit power (e.g. higher power UE's may be allocated closer to the center of the band than lower power UE's).

As further illustrated in FIG. 3, the UE receives the downlink data channel grant 311 (see FIG. 2, 213) and may receive an uplink control channel grant (FIG. 2, 209) or indication of the applicable rule (not specifically shown in FIG. 2). The UE via the explicit grant or rule indication or rule that is fully known to the UE then determines and uses the uplink control channel resources to periodically send, over the uplink control channel, data non-associated (DNA) control information. The periodically sending lasts for the longer time duration (duration of the grant) and is in accordance with the appropriate predetermined rule that is known to the scheduler and the UE, thereby limiting signaling to the UE that is associated with a full dynamic uplink control channel grant. This is exemplified in FIG. 2, 221, where the UE sends the CQI report at MCS level #C7, which was determined based on a rule in view of, for example, the specified data MCS #7. Furthermore, the UE undertakes receiving and decoding the block of data over the downlink data channel 317 (not specifically shown in FIG. 2 but implied by the ACK 3RB at 217).

Figure 4:
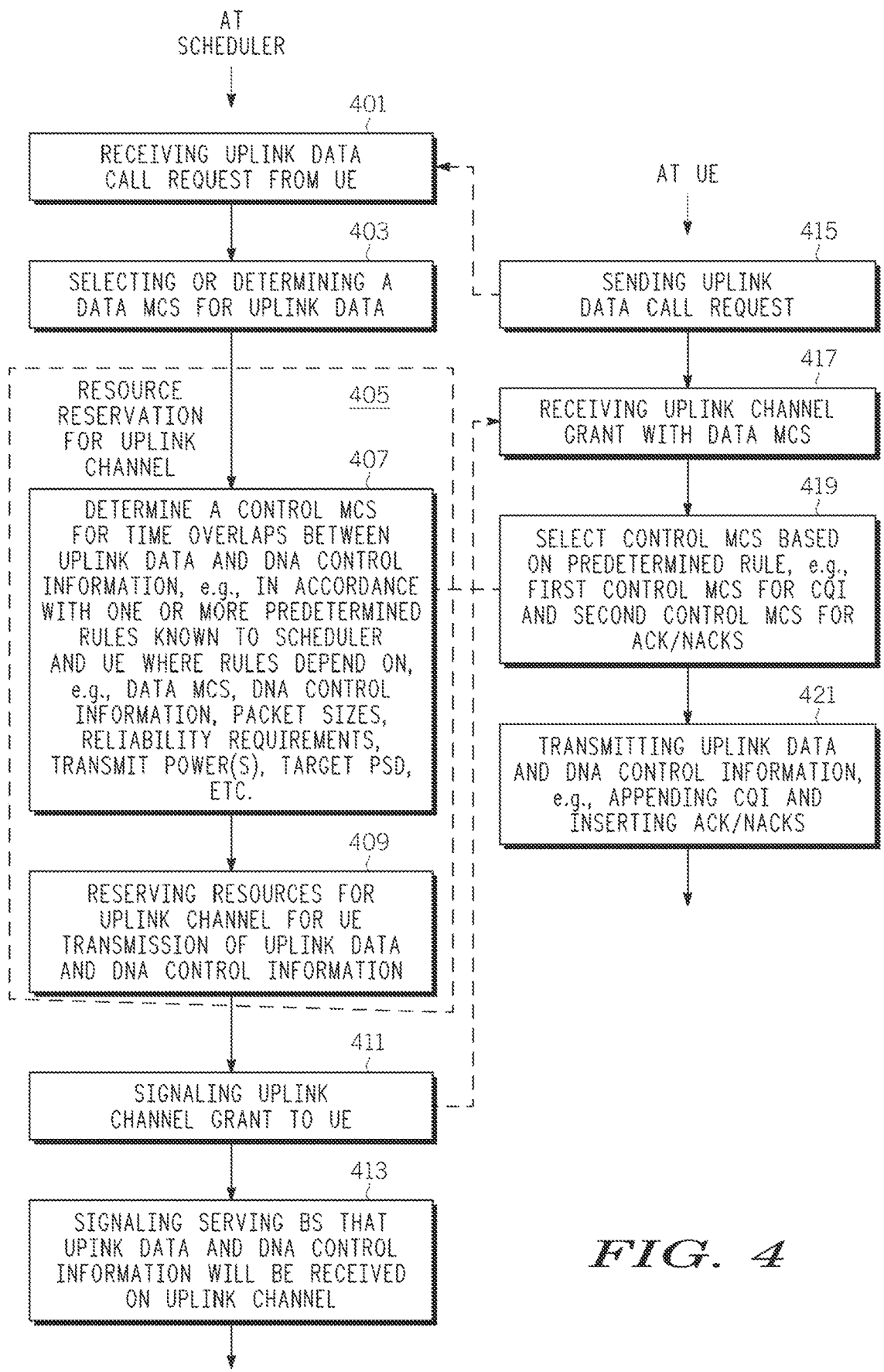
FIG. 4 shows another flow chart of processes for allocating control channels executed at a scheduler or UE in accordance with one or more embodiments.

Referring to FIG. 4, another flow chart of processes for allocating control channels executed at a scheduler or UE in accordance with one or more embodiments will be discussed and described. FIG. 4 illustrates various embodiments including some additional processes at the scheduler and at the UE and in an exemplary manner represents one or more methods of allocating uplink channels in a communication system. The method illustrates, at the resource scheduler 107, receiving an uplink data call request from a user equipment (UE) 401. FIG. 4 assumes that synchronization such as shown at 203-207 has already occurred or will occur without showing such activities. Additionally, the UE may have a persistent control channel as discussed above or a persistent or dynamic uplink DNA control channel that has just lapsed (grant expired). The method next shows selecting a data modulation coding scheme (MCS) responsive to the uplink data call request 403. It will be appreciated that the Data MCS can depend on a number of factors including the type of call, available resources, mobile capabilities/limitations, channel quality, QoS expected, etc.

The method then shows reserving resources 405 for an uplink channel or uplink data channel. The uplink channel will be used by the UE for transmission of uplink data in accordance with the data MCS, where the uplink data corresponds to the uplink data call request. One process pursuant to reserving resources is selecting or determining a control MCS for time overlaps between uplink data and DNA control information 407. Thus the reserved resources must be sufficient for transmission of data non-associated (DNA) control information (e.g., CQI reports, ACK/NACKS, etc.) in accordance with the control MCS when the transmission of the DNA control information will time overlap the transmission of uplink data. The control MCS in one or more embodiments is determined in accordance with one or more predetermined rules, which are known to both the scheduler and the UE. Given the data MCS and the control MCS, the method shows reserving resources for an uplink channel for the UE transmission of uplink data and DNA control information during any time overlaps 409. After reserving the resources 405, the method shows signaling an uplink channel grant identifying the uplink channel including the data MCS to the UE. This is illustrated in FIG. 2, 219.

The method in some embodiment further comprises informing a serving base station that the DNA control information will be received together with the uplink data on the uplink channel during the time overlap. Since the serving base station is responsible for demodulation and decoding, it will need to be aware of the uplink signal specifics in order to perform the proper operations and send the uplink data and DNA control information to the proper entities, e.g., normally the scheduler.

In some embodiments, the control MCS can be determined in accordance with a predetermined rule that is relatively straightforward, i.e., the control MCS is selected based on the data MCS. Thus for a given a data MCS, select corresponding control MCS. Thus if the data MCS is #7, the control MCS is #C7, as illustrated in FIG. 2, 221. In many systems, in the interest of simplifying the air interface, the modulation technique must be the same for each transmission, i.e., for a given data MCS a QAM level is specified and any DNA control information must also be sent at that QAM level. However the coding rate can vary between the data and the DNA control information, e.g. the data may be coded at a 5/6 rate and the DNA control may be at a 1/3 rate.

In other embodiments, the control MCS is determined in accordance with a predetermined rule and, e.g., can be selected based on the DNA control information, e.g., content of this information or relative importance or the like. For example as illustrated in FIG. 2, 221 the control MCS is selected as MCS #C7, when the uplink transmission includes a CQI report. If the DNA control information to be transmitted at 221 was an ACK/NACK, the rule could indicate that the appropriate control MCS was, e.g., MCS #C4 or the like, i.e., a different MCS based on the content or relative importance of the DNA control information (ACK/NACKs may be viewed as relatively more important than CQI reports).

In still other embodiments, the control MCS is determined in accordance with a predetermined rule that is selected in accordance with one predetermined rule from a plurality of rules. For example, the control MCS determined in accordance with one predetermined rule from a plurality of rules can be selected based on the data MCS and further based on the amount, type, or significance of the DNA control information. For example one instance or application of selecting or applying one rule from a plurality of rules is: use control MCS #C7 (at 221) given a data MCS #7 when the type or extent of the DNA control information exceeds some threshold (CQI report is normally more lengthy than ACK/NACKs), whereas MCS #C4 is selected in view of the data MCS being MCS #7 and further in view of an ACK/NACK to be transferred. It will be appreciated that the predetermined rules can consider other attributes in addition to the data MCS and DNA control information, e.g., packet sizes, reliability requirements (QoS), transmit powers, target power spectral density (PSD), etc.

The method of FIG. 4 when viewed at the UE, can include one or more of sending the uplink data call request 415 (see FIG. 2, 215), and receiving the uplink channel grant identifying the uplink channel and the data MCS 417 (see FIG. 2, 219). When the UE has DNA control information to transmit during the transmission of the uplink data, selecting the control MCS based on the known one or more predetermined rules 419 and transmitting the DNA control information in accordance with the control MCS and the uplink data in accordance with the data MCS on the uplink channel 421. This is illustrated in FIG. 2, 221, where the uplink data and DNA control information are "piggy backed" on the same uplink channel.

In various embodiments, the method at the UE where the selecting the control MCS based on the predetermined rule can include selecting a first control MCS when the DNA control information comprises a channel quality indication (CQI) and selecting a second control MCS when the data non-associated control information comprises ACK/NACKs, where the first and second control MCS can further depend on other factors as noted above. Furthermore, the particular technique used in transmitting the DNA control information on the uplink channel can vary in accordance with a known rule. For example, the UE in formatting the uplink transmission can append the channel quality indications to the uplink data, whereas it may insert the ACK/NACKs into the uplink data. Appending means that the coded CQI information is appended to the coded uplink data, while inserting means that the coded ACK/NACK is inserted at selected locations in the coded uplink data (coded uplink data is punctured or overwritten and error correction is used to recover the data). Again the specifics depend on having known rules or algorithms at the scheduler so appropriate resources are reserved and granted and at the UE so the transmission is appropriately formatted.

Figure 5:
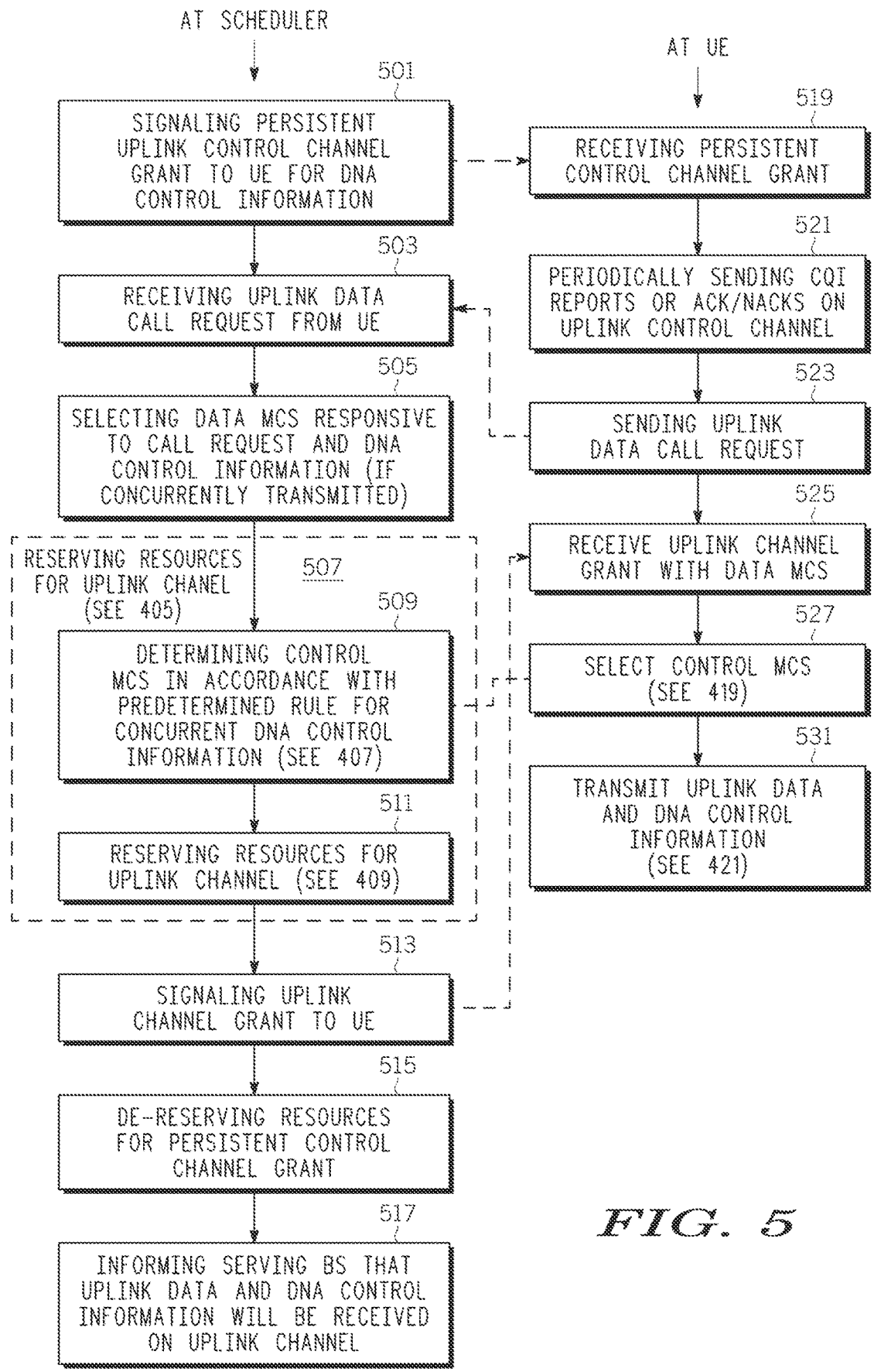
FIG. 5 shows yet another flow chart of processes for allocating control channels executed at a scheduler or UE in accordance with one or more embodiments.

Referring to FIG. 5, a further flow chart of processes for allocating control channels executed at a scheduler or UE in accordance with one or more embodiments will be discussed and described. FIG. 5 illustrates a situation, such as depicted in one embodiment in FIG. 2 where a UE is granted a persistent uplink control channel as well as other new processes. The discussion here will be more or less in summary form, where the essential concepts and underlying implementation details have been previously discussed.

In FIG. 5 a method at a resource scheduler of allocating uplink channels in a communication system is shown. The method includes signaling a persistent uplink control channel grant to a user equipment (UE) 501 (see FIG. 2, 209), where the persistent control channel is for use by the UE for transmission of data non-associated (DNA) control information (CQI, ACK/NACKs). The method further illustrates receiving an uplink data call request from the UE 503 (see FIG. 2, 215). Selecting a data modulation coding scheme (MCS) responsive to the uplink data call request and the DNA control information that will be concurrently transmitted by the UE is illustrated at 506. Next, the method shows reserving resources for an uplink channel 507 (see above 405) to be used by the UE for transmission of uplink data in accordance with the data MCS, where the uplink data corresponds to the uplink data call request. Since the resources must be sufficient for transmission of the DNA control information in accordance with a control MCS when the transmission of the DNA control information will be concurrent with the transmission of uplink data, the reservation activity includes determining the control MCS 509. The control MCS is determined in accordance with a predetermined rule known to the scheduler and the UE for concurrent DNA control information transmission (see above 409) and may depend on various factors including the data MCS and amount of DNA control information as well as others noted above. After determining the control MCS, reserving the resources for the uplink channel is performed 511 (see above 409). The method of FIG. 5 further illustrates signaling an uplink channel grant identifying the uplink channel including the data MCS to the UE 513 (see FIG. 2, 219 and above discussion).

Furthermore, in some embodiments in accordance with the method of FIG. 5, the scheduler can operate to de-reserve or relinquish resources for the persistent uplink control channel for the duration of the uplink channel grant, thereby allowing those resources to be available for a grant to another UE during this time frame 515. As noted in other methods, the FIG. 5 method can include informing a serving base station that the DNA control information will be received using the control MCS together with the uplink data using the data MCS on the uplink channel for the duration of the uplink channel grant.

As illustrated in FIG. 5, at the UE, the method includes receiving the persistent uplink control channel grant 519 and periodically sending CQI reports or ACK/NACKs on this uplink control channel 521. The UE when needed sends an uplink data call request 523 and responsive thereto receives an uplink channel grant with a data MCS 525. The UE selects a control MCS in accordance with above discussions (see 419) and transmits the uplink data and DNA control information (see 421). In some embodiments, the predetermined rule for selecting the control MCS may allow the UE to use variable rate or flexible rate coding either for the DNA control information or the uplink data. The general idea is that in present systems, such as E-UTRA systems, the granularity of Resource Blocks (RBs) as well as MCS levels means that the coded signal seldom fills up the entire RB grant. Thus a UE can apply variable rate coding to, e.g., the DNA control information, and essentially add a higher degree of error correction capability to this information, where the rate is controlled by the capacity of the RB grant. Again the UE and the scheduler must know the rule, in order to apply this notion.

Figure 6:
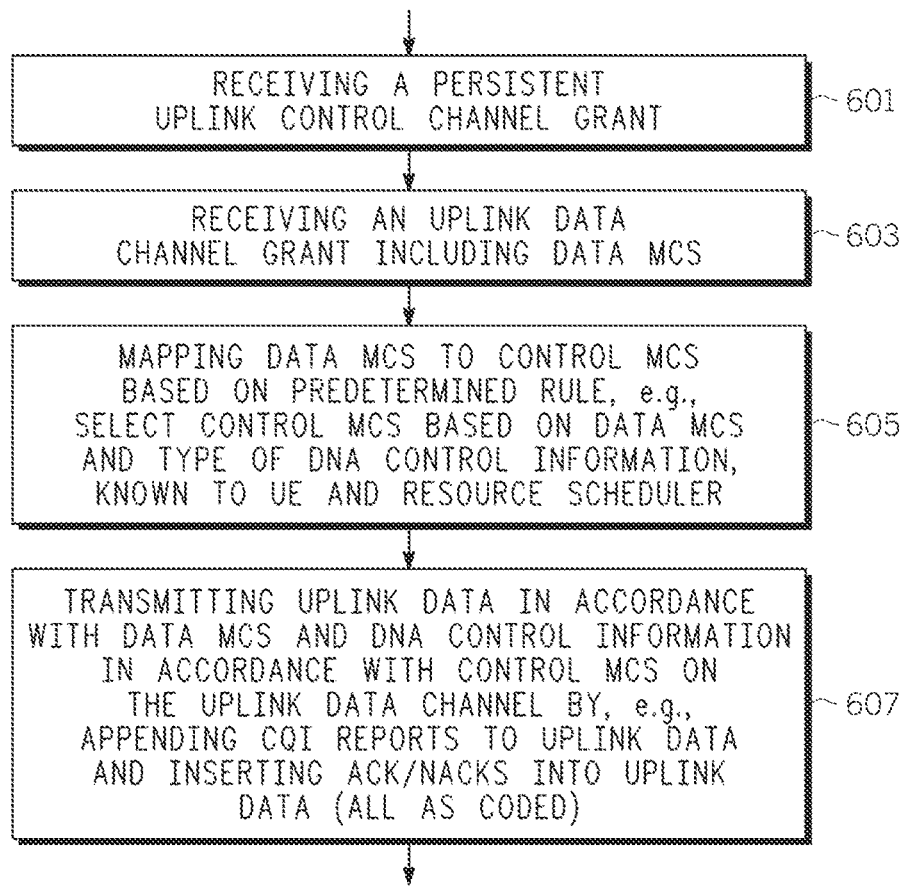
FIG. 6 illustrates a flow chart of processes for allocating control channels executed at a UE in accordance with one or more embodiments.

Referring to FIG. 6, processes for allocating control channels executed at a UE in accordance with one or more embodiments will be discussed and described. Much of these discussions is a review of some of the above concepts where details have been discussed. FIG. 6 illustrates a method at a user equipment of choosing an uplink control channel in a communication system, e.g., E-UTRA system. The method includes receiving a persistent uplink control channel grant 601, where the persistent control channel is for use by the UE for transmission of data non-associated (DNA) control information and receiving an uplink data channel grant including a data MCS 603, where the grant can overlap at least a portion of the persistent control channel grant. The method further includes mapping the data MCS to a control MCS based on a predetermined rule known to the UE and a resource scheduler 605 and transmitting uplink data in accordance with the data MCS and DNA control information in accordance with the control MCS on the uplink data channel.

In various embodiments, the mapping the data MCS to a control MCS based on a predetermined rule further comprises selecting the control MCS based on the data MCS and the type of DNA control information and may include other factors (see above) in the mapping procedure or rule.

In some embodiments, the transmitting uplink data in accordance with the data MCS and DNA control information in accordance with the control MCS on the uplink data channel further comprises appending a channel quality indication (CQI) report coded in accordance with a first control MCS to the uplink data coded in accordance with the data MCS and inserting ACK/NACKS coded in accordance with a second control MCS into the uplink data coded in accordance with the data MCS.

It will be appreciated that the above described functions and methodologies may be repeated as needed and may be practiced in various resource schedulers taking various forms as well as various UEs.

The processes, apparatus, and systems, discussed above, and the inventive principles thereof are intended to and can alleviate or reduce overhead associated with some uplink control channel grants as proposed or utilized by prior art techniques.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, comprising:
a user equipment device (UE),
  receiving, from a base station, a downlink data channel grant;
  receiving, from the base station, signaling indicating a predetermined rule or set of rules that are known to the base station and the UE;
  periodically sending, to the base station and over an uplink control channel, data non-associated, DNA, control information, on resources for the uplink control channel in accordance with the predetermined rule or set of rules, wherein said periodically sending lasts for a longer time than a duration of the downlink data channel grant; and
  receiving a block of data over a downlink data channel in accordance with resources identified in the downlink data channel grant.

2. The method of claim 1,
wherein the resources for the uplink control channel are reserved for a longer time duration than resources identified in the downlink data channel grant for the downlink data channel.

3. The method of claim 1,
where the predetermined rule or set of rules limits signalling to the UE that is associated with a full dynamic uplink control channel grant.

4. The method of claim 1,
wherein, receiving the block of data includes the UE:
  receiving the block of data over the downlink data channel prior to a first instance of sending DNA control information on resources for the uplink control channel.

5. The method of claim 1,
wherein a rule of the predetermined rule or set of rules depends on semi-static dimensions of resources dedicated for control channel signaling.

6. The method of claim 1,
wherein a rule of the predetermined rule or set of rules depends on physical partitioning of resources dedicated for control channel signaling.

7. The method of claim 1,
wherein a rule of the predetermined rule or set of rules depends on channel quality of the UE or UE transmit power.

8. The method of claim 1,
wherein the resources for the uplink control channel in accordance with the predetermined rule or set of rules are dedicated for use by the UE.

9. The method of claim 1,
wherein the signaling indicating the predetermined rule or set of rules that are known to the base station and the UE are received instead of an explicit uplink control channel grant.

10. A method, comprising:
a base station,
   transmitting, to a user equipment device (UE), a downlink data channel grant;
   transmitting, to the UE, signaling indicating a predetermined rule or set of rules that are known to the base station and the UE;
   periodically receiving, over an uplink control channel, data non-associated (DNA) control information on resources for the uplink control channel in accordance with the predetermined rule or set of rules, wherein the resources for the uplink control channel are reserved for a longer time duration than resources for a downlink data channel indicated by the downlink data channel grant; and
   transmitting a block of data over the downlink data channel in accordance with resource identified in the downlink data channel grant.

11. The method of claim 10,
wherein said periodically receiving lasts for a longer time than a duration of the downlink data channel grant.

12. The method of claim 10,
where the predetermined rule or set of rules limits signalling to the UE that is associated with a full dynamic uplink control channel grant.

13. The method of claim 10,
wherein transmitting the block of data includes the base station:
   transmitting the block of data over the downlink data channel prior to a first instance of sending DNA control information on resources for the uplink control channel.

14. The method of claim 10,
wherein a rule of the predetermined rule or set of rules depends on at least one of:
   semi-static dimensions of resources dedicated for control channel signaling;
   physical partitioning of resources dedicated for control channel signaling; or
   channel quality of the UE or UE transmit power.

15. The method of claim 10,
wherein the resources for the uplink control channel in accordance with the predetermined rule or set of rules are dedicated for use by the UE.

16. The method of claim 10,
wherein the signaling indicating the predetermined rule or set of rules that are known to the base station and the UE are transmitted instead of an explicit uplink control channel grant.

17. An apparatus, comprising:
a memory; and
one or more integrated circuits in communication with the memory, wherein the one or more integrated circuits are configured to:
   transmit, to a user equipment device (UE), a downlink data channel grant;
   transmit, to the UE, signaling indicating a predetermined rule or set of rules that are known to the apparatus and the UE;
   periodically receive, over an uplink control channel, data non-associated (DNA) control information on resources for the uplink control channel in accordance with the predetermined rule or set of rules, wherein the resources for the uplink control channel are reserved for a longer time duration than resources for a downlink data channel indicated by the downlink data channel grant; and
   transmit a block of data over the downlink data channel in accordance with resource identified in the downlink data channel grant.

18. The apparatus of claim 17,
wherein said periodically receiving lasts for a longer time than a duration of the downlink data channel grant.

19. The apparatus of claim 17,
wherein the resources for the uplink control channel in accordance with the predetermined rule or set of rules are dedicated for use by the UE.

20. The apparatus of claim 17,
wherein the signaling indicating the predetermined rule or set of rules that are known to the apparatus and the UE are transmitted instead of an explicit uplink control channel grant.

* * * * *